US007728235B2

(12) United States Patent
Mann

(10) Patent No.: US 7,728,235 B2

(45) Date of Patent: Jun. 1, 2010

(54) ELECTRICAL POWER FEED THRU FOR AIRCRAFT FUSELAGES

(75) Inventor: Karl Edward Mann, Farmingville, NY (US)

(73) Assignee: Northrop Grumman Systems Corporation, Los Angeles, CA (US)

( * ) Notice: Subject to any disclaimer, the term of this patent is extended or adjusted under 35 U.S.C. 154(b) by 395 days.

(21) Appl. No.: 11/865,275

(22) Filed: Oct. 1, 2007

(65) Prior Publication Data

US 2009/0084579 A1 Apr. 2, 2009

(51) Int. Cl.
*H02G 3/18* (2006.01)

(52) U.S. Cl. ....................... 174/650; 174/135; 174/665; 174/152 R; 439/271; 285/151.1

(58) Field of Classification Search ................. 174/650, 174/653–658, 664–665, 135, 152 R; 439/271, 439/519, 98, 394; 285/151.1
See application file for complete search history.

(56) References Cited

U.S. PATENT DOCUMENTS 3,321,733 A 5/1967 Thomas
4,463,774 A 8/1984 Gorges et al.
4,985,922 A 1/1991 Kolbert
5,231,325 A * 7/1993 Tamai et al. ........... 310/323.12
5,423,692 A 6/1995 Francis
5,648,639 A * 7/1997 Hand .......................... 174/51
6,076,571 A * 6/2000 Burns et al. ................. 141/383
6,193,548 B1 2/2001 Sigl et al.
6,709,274 B2 3/2004 Lazaro, Jr. et al.
6,803,523 B2 10/2004 Yuasa et al.
7,048,561 B1 * 5/2006 Elbaz ......................... 439/271
2002/0039846 A1 4/2002 Lazaro, Jr. et al.

FOREIGN PATENT DOCUMENTS

JP 06188614 7/1994

* cited by examiner

*Primary Examiner*—Dhiru R Patel
(74) *Attorney, Agent, or Firm*—Alan G. Towner, Esq.; Pietragallo Gordon Alfano Bosick & Raspanti, LLP

(57) ABSTRACT

An electrical power feed thru for thin-walled vessels such as aircraft fuselages is disclosed which allows high electrical current power lines, and their associated high operating temperatures, to transition from the inside to the outside of the aircraft. The feed thru includes sealing surfaces, anti-rotation features and safety covers. This low-profile configuration permits the attached cables to run close to the fuselage walls, permitting easier routing and clamping. The feed thru has a variable geometry which permits alternate spacing of the end terminations in reference to the fuselage while maintaining the same parts. Installation is simplified through a single fuselage wall mounting hole design that can be done with a standard punch. The feed thru exceeds the shock and vibration environments of various aircraft such as a military aircraft.

18 Claims, 3 Drawing Sheets

60
65
66
68
64
62
63
40
5
30
20
12
13
14
52
58
56
50
54
10

ELECTRICAL POWER FEED THRU FOR AIRCRAFT FUSELAGES

FIELD OF THE INVENTION

The present invention relates to electrical connections through thin-walled vessels such as pressurized aircraft fuselages, and more particularly relates to an electrical power feed thru capable of carrying high electrical current and withstanding high operating temperatures in high vibration environments.

BACKGROUND INFORMATION

In certain types of aircraft, a need exists for feeding electrical current through the fuselage into the aircraft. For example, it would be desirable to equip an E-2 Advance Hawkey Aircraft with generator feeder cables through its fuselage. However, the feed thru must be capable of carrying high electrical currents, and must also be able to handle high operating temperatures associated with such high currents. Furthermore, since the electrical power feed thru runs from the unpressurized exterior of the aircraft to the pressurized interior of the aircraft, it must maintain a pressure seal during operation of the aircraft under dynamically changing conditions.

SUMMARY OF THE INVENTION

The present invention provides an electrical power feed thru for thin-walled vessels such as aircraft fuselages. The feed thru allows high electrical current power lines, and their associated high operating temperatures, to transition from the inside of an aircraft pressurized area to the outside un-pressurized area. The feed thru includes sealing surfaces, anti-rotation features and safety covers. This low-profile configuration permits the attached cables to run close to the fuselage walls, permitting easier routing and clamping. The feed thru has a variable geometry which permits alternate spacing of the end terminations in reference to the fuselage while maintaining the same parts. Installation is simplified through a single fuselage wall mounting hole design that can be done with a standard punch. The feed thru exceeds the shock and vibration environments of various aircraft such as a military aircraft.

An aspect of the present invention is to provide an electrical power feed thru for a thin-walled vessel comprising: an electrically conductive bus bolt structured and arranged to extend through a wall of the vessel, an outside wall insulator surrounding a first portion of the bus bolt structured and arranged for installation adjacent to an exterior surface of the wall, and an inside wall insulator surrounding a second portion of the bus bolt structured and arranged for installation adjacent to an interior surface of the wall. In one embodiment, the thin-walled vessel is a pressurized aircraft fuselage.

This and other aspects of the present invention will be more apparent from the following description.

DETAILED DESCRIPTION

Figures 1, 2:
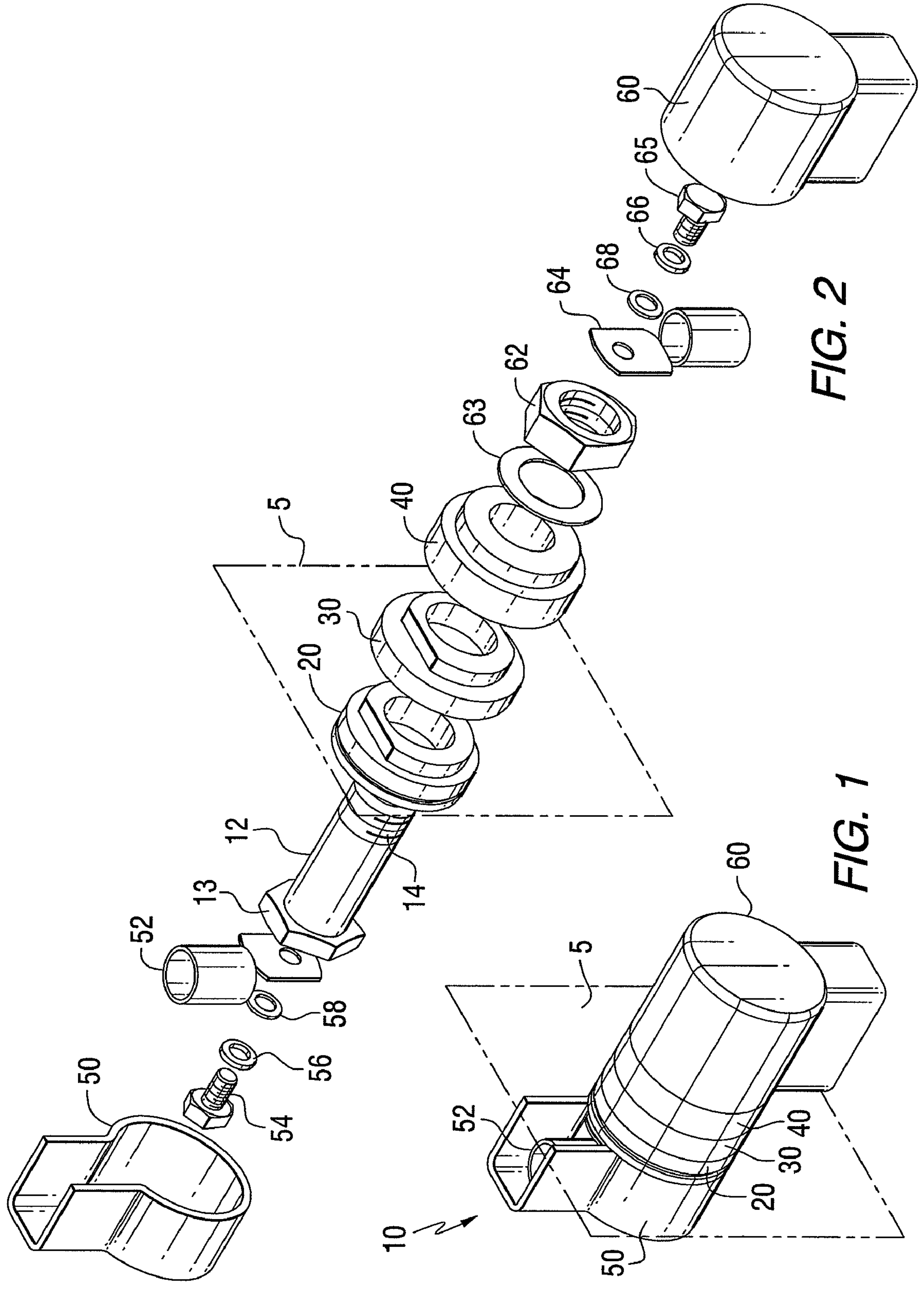
FIG. 1 is an isometric view of an electrical power feed thru extending through a fuselage wall in accordance with an embodiment of the present invention.
FIG. 2 is an exploded isometric view showing the components of the electrical power feed thru of FIG. 1.
Figure 3:
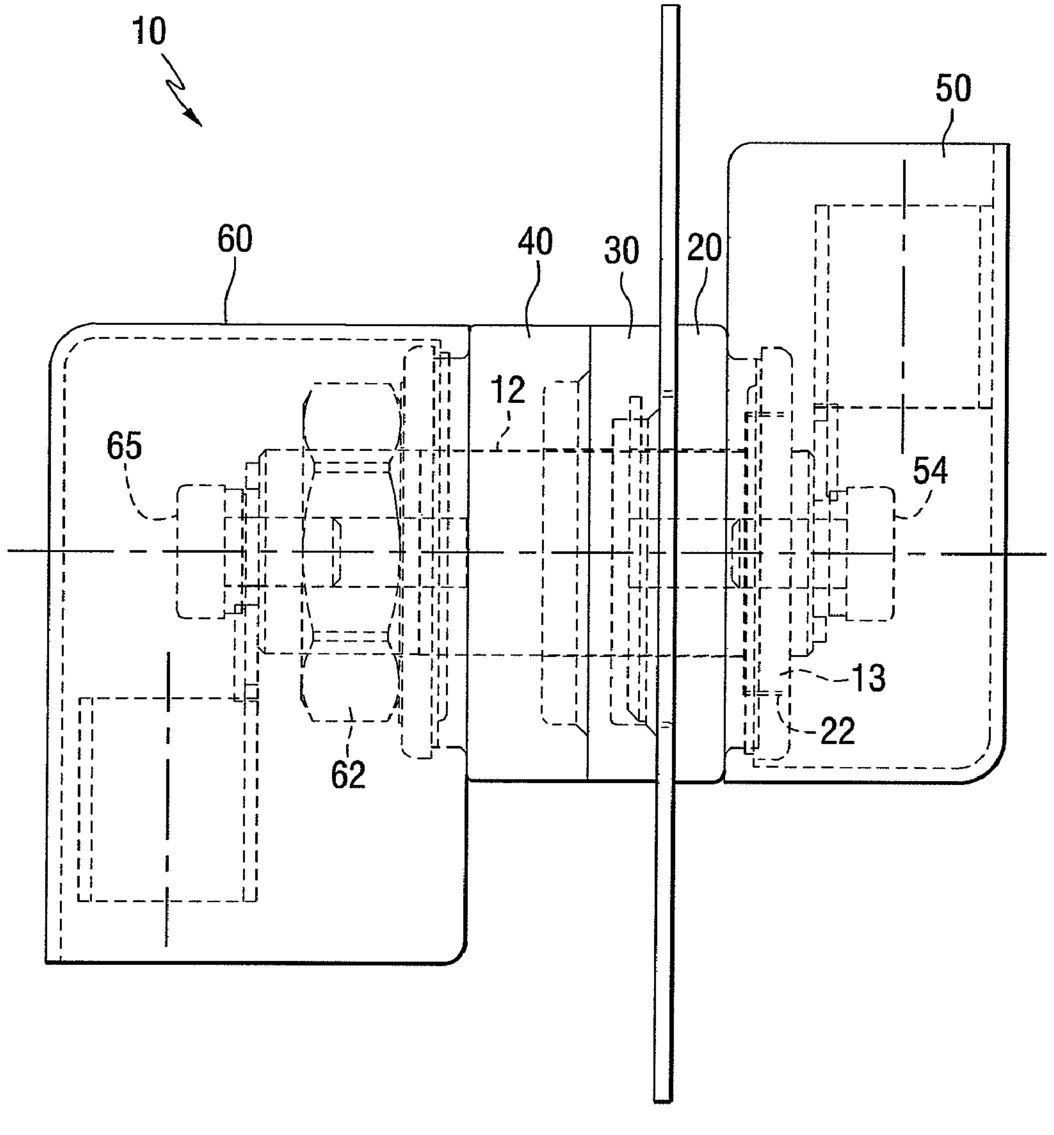
FIG. 3 is a side view of an electrical power feed thru extending through a fuselage wall in accordance with an embodiment of the invention.
Figure 4:
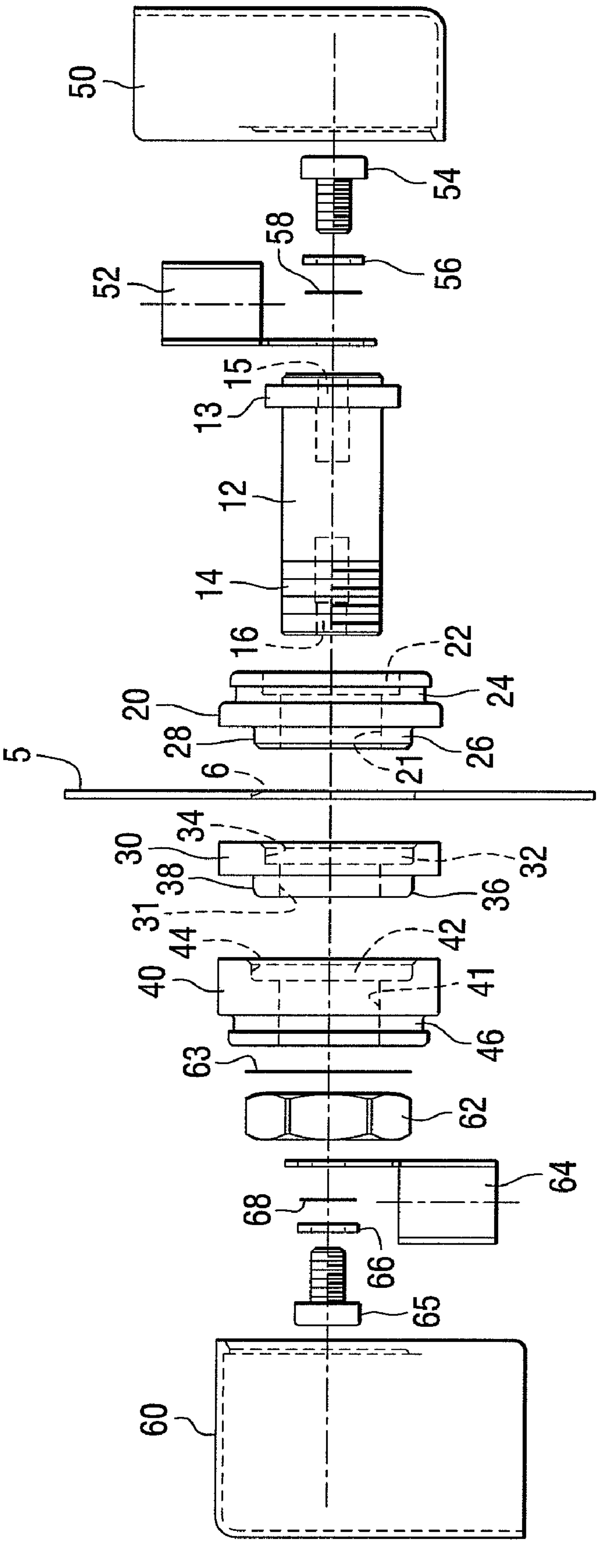
FIG. 4 is an exploded side view of the electrical power feed thru of FIG. 3.

FIGS. 1-4 illustrate an electrical power feed thru 10 extending through an aircraft fuselage wall 5 in accordance with an embodiment of the present invention. The aircraft fuselage wall 5 may be part of a pressurized aircraft. Alternatively, the aircraft may be unpressurized. In addition to aircraft fuselage walls, the electrical power feed thru may be used with other thin-walled vessels such as other types of vehicles or tanks.

The electrical power feed thru 10 includes a bus bolt 12 made of conductive material such as copper. The bus bolt 12 has a hex head 13 and a threaded end 14. In the embodiment shown in the figures, the hex head 13 of the bus bolt 12 is located on the exterior side of the fuselage wall 5. However, the orientation of the assembly may be switched to the interior of the fuselage wall 5 if desired. The bus bolt 12 has an external tapped hole 15 and an internal tapped hole 16, as shown most clearly in FIG. 4.

The electrical power feed thru 10 includes an outside wall insulator 20 having a generally annular shape with a close tolerance hole 21 for receiving the bus bolt 12. The outside wall insulator 20 includes a hex indentation 22 shaped to receive the hex head 13 of the bus bolt 12. An annular groove 24 is provided for attachment of the exterior insulating cover 50, as more fully described below. The outside wall insulator 20 has a reduced outer diameter extension 26 having a flat portion 28 forming a generally D-shaped projection corresponding to a similarly D-shaped hole 6 in the fuselage 5 for anti-rotation purposes.

The electrical power feed thru 10 also includes a locator insulator 30 having a generally annular shape with a close tolerance hole 31 for receiving the bus bolt 12. The locator insulator 30 includes a circular indentation 32 with a flat portion 34 which forms a generally D-shaped indentation corresponding to the D-shaped extension 26 of the outside wall insulator 20. The locator insulator 30 has a reduced outer diameter extension 36 with a flat portion 38 forming a generally D-shaped projection corresponding to a similarly shaped indentation in the inside wall insulator 40, as more fully described below.

The inside wall insulator 40 has a generally annular shape with a close tolerance hole 41 for receiving the bus bolt 12. The inside wall insulator 40 includes a circular indentation 42 with a flat portion 44 forming a generally D-shaped indentation corresponding to the generally D-shaped extension 36 of the locator insulator 30. The inside wall insulator 40 has an annular groove 46 for securing the inside insulating cover 60, as more fully described below.

Although generally D-shaped extensions and recesses are shown in the figures, any other shape or configuration may be used which prevents relative rotation of the outside wall insulator 20, locator insulator 30 and inside wall insulator 40, and which also prevents rotation of the insulator assembly in relation to the fuselage wall 5.

The outside insulating cover 50 snaps into the annular groove 24 of the outside wall insulator 20. An exterior cable connector 52 is secured to the hex head 13 of the bus bolt 12 by a bolt 54 threaded into the external tapped hole 15 of the bus bolt 12. One or more washers may be used with the bolt 54. For example, a lock washer 56 and a flat washer 58 may be used.

The inside insulating cover 60 snaps into the annular groove 46 in the inside wall insulator 40. A bus bolt nut 62 is threaded onto the threaded end 14 of the bus bolt 12 using a washer 63 that distributes the load applied to the inside wall insulator 40. An interior cable connector 64 is secured to the threaded end 14 of the bus bolt 12 by a bolt 65 that is threaded into the internal tapped hole 16 of the bus bolt 12. The bolt 65 may be inserted through a conductive lock washer 66 and a flat washer 68.

The bus bolt 12 is the power conductor. In one embodiment, the bus bolt 12 may be a machined part made of conductive copper. Each end of the bus bolt 12 is drilled and tapped to provide the holes 15 and 16 for the mounting bolts 54 and 65. Where required for strength, stainless helicoil inserts (not shown) may be utilized to reinforce the threads. The hex head 13 of the bus bolt 12 provides anti-rotation when assembled into the outside wall insulator 20.

The outside wall insulator 20, locator insulator 30 and inside wall insulator 40 may be made of any suitable electrically insulating material that is capable of withstanding the elevated temperatures resulting from the high currents conducted through the bus bolt 12. For example, the outside wall insulator may be made of a plastic material such as high temperature phenolic or a crosslinked polymer having a glass transition over 200° C. Adhesive sealant may optionally be used between the insulators 20, 30 and 40 in order to maintain a pressure seal for the fuselage during operation. Suitable adhesive sealants capable of withstanding the relatively high temperature include commercially available high temperature silicone adhesive sealants.

The electrical power feed thru 10 may be subjected to typical electrical currents from about 1,500 to about 3,000 amperes. During operation, the relatively high electrical currents generate elevated temperatures up to about 200° C., for example, from about 80° C. to about 100° C.

Whereas particular embodiments of this invention have been described above for purposes of illustration, it will be evident to those skilled in the art that numerous variations of the details of the present invention may be made without departing from the invention as defined in the appended claims.

The invention claimed is:

1. An electrical power feed thru for a thin-walled vessel comprising: an electrically conductive bus bolt structured and arranged to extend along an axis through a wall of the vessel; an outside wall insulator surrounding a first portion of the bus bolt structured and arranged for installation adjacent to an exterior surface of the wall; and an inside wall insulator surrounding a second portion of the bus bolt structured and arranged for installation adjacent to an interior surface of the wall, wherein the electrically conductive bus bolt is prevented from rotating around the axis with respect to the outside wall insulator and the inside wall insulator, and wherein the outside and inside wall insulators are shaped to prevent rotation around the axis with respect to each other.

2. The electrical power feed thru of claim 1, wherein the electrically conductive bus bolt comprises a hex head received within a corresponding hex indentation in either the outside or inside wall insulator.

3. The electrical power feed thru of claim 1, wherein the electrically conductive bus bolt comprises a threaded end and a nut is secured on the threaded end.

4. The electrical power feed thru of claim 1, wherein one of the outside and inside wall insulators has an axially extended portion and the other one of the outside and inside wall insulators has an axially recessed portion which receives the extended portion to prevent said rotation.

5. The electrical power feed thru of claim 1, wherein at least one of the outside and inside wall insulators contacts the wall of the vessel.

6. The electrical power feed thru of claim 5, wherein the at least one of the outside and inside wall insulators forms a seal against the wall of the vessel.

7. The electrical power feed thru of claim 1, wherein at least one end of the electrically conductive bus bolt comprises a tapped hole which receives a threaded bolt for securing an electrical cable connector to the bus bolt.

8. The electrical power feed thru of claim 7, wherein the electrical cable connector extends from the bus bolt in a direction substantially perpendicular to an axial direction of the bus bolt.

9. The electrical power feed thru of claim 1, further comprising:

- an exterior cable connector extending from one end of the bus bolt; and
- an interior cable connector extending from another end of the bus bolt.

10. The electrical power feed thru of claim 9, wherein the cable connectors extend from the bus bolt in directions substantially perpendicular to an axial direction of the bus bolt.

11. The electrical power feed thru of claim 1, further comprising a locator insulator surrounding a third portion of the bus bolt positioned between the outside and inside wall insulators.

12. The electrical power feed thru of claim 11, wherein the locator insulator has at least one axially extended portion received within a corresponding axially recessed portion of either the outside or inside wall insulator to prevent rotation of the locator insulator with respect to the outside or inside wall insulator.

13. The electrical power feed thru of claim 11, wherein the locator insulator has at least one axially recessed portion which receives a corresponding axially extended portion of either the outside or inside wall insulator to prevent rotation of the locator insulator with respect to the outside or inside wall insulator.

14. The electrical power feed thru of claim 11, wherein the locator insulator contacts the wall of the vessel.

15. The electrical power feed thru of claim 1, further comprising:

- an outside insulating cover adjacent to one end of the bus bolt; and
- an inside insulating cover adjacent to another end of the bus bolt.

16. The electrical power feed thru of claim 15, wherein the outside insulating cover is mounted on the outside wall insulator, and the inside insulating cover is mounted on the inside wall insulator.

17. The electrical power feed thru of claim 1, wherein the thin walled vessel comprises an aircraft fuselage.

18. The electrical power feed thru of claim 17, wherein the aircraft fuselage is pressurized.

* * * * *